United States Patent
Brug et al.

(10) Patent No.: US 7,494,681 B2
(45) Date of Patent: *Feb. 24, 2009

(54) FOOD PRODUCTS COMPRISING FAT AND A SALT

(75) Inventors: Johannes Cornelis Brug, Baarn (NL); Eckhard Flöter, Vlaardingen (NL); Gabriel Lansbergen, Wassenaar (NL)

(73) Assignee: Unilever Bestfoods North America, division of Conopco, Inc., Englewood Cliffs, NJ (US)

( * ) Notice: Subject to any disclaimer, the term of this patent is extended or adjusted under 35 U.S.C. 154(b) by 499 days.

This patent is subject to a terminal disclaimer.

(21) Appl. No.: 10/535,489

(22) PCT Filed: Oct. 29, 2003

(86) PCT No.: PCT/EP03/12031

§ 371 (c)(1),
(2), (4) Date: May 17, 2005

(87) PCT Pub. No.: WO2004/045296

PCT Pub. Date: Jun. 3, 2004

(65) Prior Publication Data

US 2006/0003078 A1    Jan. 5, 2006

(30) Foreign Application Priority Data

Nov. 18, 2002 (EP) .................. 02079834

(51) Int. Cl.
 *A23D 7/00* (2006.01)
 *A23D 9/00* (2006.01)
(52) U.S. Cl. ..................................... 426/607
(58) Field of Classification Search .................. 426/607
See application file for complete search history.

(56) References Cited

U.S. PATENT DOCUMENTS

| | | | | |
|---|---|---|---|---|
| 4,016,302 | A | * | 4/1977 | Kattenberg et al. .......... 426/607 |
| 5,718,938 | A | * | 2/1998 | Cain et al. .................... 426/549 |
| 5,756,143 | A | * | 5/1998 | Cain et al. .................... 426/606 |
| 5,939,114 | A | | 8/1999 | Cain et al. |
| 2002/0098275 | A1 | * | 7/2002 | Bodnar et al. ................ 426/612 |

FOREIGN PATENT DOCUMENTS

| | | |
|---|---|---|
| EP | 1 249 172 A | 10/2002 |
| WO | 96/39855 | 12/1996 |
| WO | 97/16978 | 5/1997 |

OTHER PUBLICATIONS

Chemical compound .Encyclopaedia Britannica. 2007. Encyclopaedia Britannica Online. Nov. 15, 2007 available at http://www.search.eb.com/eb/article-79717.*
European Search Report on Application No. 02079834.4-2114 dated Feb. 27, 2003.
Database WPI, Derwent Publications Ltd., XP 002232809 &RU 2 152 726 (abstract).

* cited by examiner

*Primary Examiner*—Arthur L Corbin
(74) *Attorney, Agent, or Firm*—Ellen Plotkin

(57) ABSTRACT

Food compositions comprising 5-80% wt of triglycerides of fatty acids, 2-80% wt of an edible salt, which compositions contain less than 15% moisture, wherein the amount of H3 (triglyceride of 3 saturated fatty acids of 16 or more carbon atoms) and H2U (triglyceride of 2 saturated fatty acids of 16 or more carbon atoms and 1 cis-unsaturated fatty acid) taken together is at least 55% wt based on the total amount of triglycerides.

6 Claims, No Drawings

FOOD PRODUCTS COMPRISING FAT AND A SALT

FIELD OF THE INVENTION

The present invention relates to savoury food compositions which contain fat and a salt, and in particular savoury food compositions comprising triglycerides of fatty acids, wherein the composition is low in triglycerides of trans-unsaturated fatty acids.

BACKGROUND OF THE INVENTION

Savoury food compositions contain in many cases fat. This is especially the case for particulate and/or pasty compositions, which are often dry. Dry in this context is to be understood as comprising less than 15% (wt), preferably less than 10% (wt) of water. Particulate in this context is to be understood as powder, flakes, cubes, pellets etcetera. Examples of such products are e.g. bouillon cubes, culinary cubes, soup- and sauce mixes, etcetera.

The fats in such savoury compositions usually comprise a considerable amount triglycerides of fatty acids (hereinafter for short: triglycerides). Fats are usually mixtures of various triglycerides. The type of fat or fat blend used for a given purpose is determined (next to availability and price) by e.g. the properties the fat has and how it performs in a given product, and in the manufacture of such product. The fat should perform well on e.g. taste, melting in the mouth, taste keepability, but also on ability to be processed into a suitable product as well as performance in the packed product, e.g. keepability (in particular fat staining for cubes packaged in cardboard).

The triglycerides (which form part or all of the fat) are usually obtained from vegetable sources and may have been subjected to various treatments, such as fractionation (dry or wet), purification, hardening, interesterification, blending etcetera, to give the fat the desired product properties. Hardening unsaturated fat or triglycerides to saturated or partially unsaturated fat or triglycerides is in particular a tool used to obtain the desired melting behaviour. In this way, oils or soft fats can be turned into fats showing more suitable properties for solid or dry formulations.

The hardening process may lead to formation of a certain amount of so-called trans-unsaturated fatty acids (and/or triglycerides of such trans-unsaturated fatty acids), in short TFA's. For various reasons it may be desired to reduce or eliminate the amount of trans-unsaturated fatty acids (and triglycerides thereof) in products. For spreads (margerines and the like) a wide range of possible alternative fats and triglycerides are proposed, as is disclosed in e.g. WO 97/16978 and WO 96/39855.

The triglycerides mentioned in such applications frequently contain lauric acid (C12 saturated fatty acid). It has been found that when one wishes to find an alternative for the trans-unsaturated fatty acids (and fats containing them) in savoury applications lauric acid is undesired. Lauric acid and triglycerides containing lauric acid may show a range of desirable properties, in particular melting behaviour, but in a savoury application triglycerides of lauric acid were found to lead to a (soapy) off-flavour, especially after prolonged storage.

Hence, there is a desire for dry and/or particulate savoury products which contain triglyceride fats which are low in trans-unsaturated fatty acids (e.g. below 5% of the total fats present, preferably less than 2%), but which still should perform well in a savoury composition, in particular concerning processability, fat staining, crystallisation, mouth feel, and other characteristics as mentioned above. Preferably, such product should also be low in lauric acid or triglycerides thereof (e.g. below 10% of the total fats present, preferably less than 3%, most preferably less than 0.5% wt of the total fats present).

Triglyceride fats can be grouped according to the fatty acids of which they consist (i.e. the acyl moiety of triacyl glycerides). Such groups can be identified by a letter, and herein:

H means saturated fatty acid of 16 carbon atoms or longer (C16+, e.g. up to C24)

U means unsaturated fatty acids in cis conformation (any chain length)

E means unsaturated fatty acids in trans conformation (any chain length)

M means saturated fatty acids of 10-14 carbon atoms (C10-C14)

As the present application is about triglycerides of such fatty acids, the fatty acid composition of the triglycerides is given by for example:

H3 (meaning a triglyceride of 3 saturated fatty acids of 16 or more carbon atoms)

H2E (meaning a triglyceride of 2 saturated fatty acids of 16 or more carbon atoms and 1 trans-unsaturated fatty acid)

H2M (meaning a triglyceride of 2 saturated fatty acids of 16 or more carbon atoms and 1 saturated fatty acid of 10-14 carbon atoms)

H2U (meaning a triglyceride of 2 saturated fatty acids of 16 or more carbon atoms and 1 cis-unsaturated fatty acid)

HE2 (meaning a triglyceride of 1 saturated fatty acid of 16 or more carbon atoms and 2 trans-unsaturated fatty acids), and so on for other 3 letter codes.

Fat compositions can thus be characterised in containing certain weight percentages (based on the total amount of triglycerides) of triglycerides of the above codes.

Although it is mentioned for E and U that they may have any length, it is to be understood that this relates to fatty acids of approx. 8-24 carbon atoms, and more usually 16-20 carbon atoms. U.S. Pat. No. 5,718,938 discloses manufacturing a batter, a dough, and bakery products such as cookies and cakes with lower than normal SAFA (saturated and trans fatty acid residues).

WO 94/16572 discloses manufacturing a (homogeneous) puff-pastry margerine containing at least 60% fat, the fat being free of trans fatty acids.

SUMMARY OF THE INVENTION

It has now been found that the objectives as given above may be met (at least in part) by a savoury food composition comprising 5-80% wt (preferably 10-70% wt, most preferably 15-50% wt) of triglycerides of fatty acids, 2-80% wt (preferably 5-70% wt, most preferably 10-60% wt) of an edible salt and which composition contains less than 15% wt (preferably less than 10% wt, more preferably even less than 5% wt) of water, wherein the amount of H3 (triglyceride of 3 saturated fatly acids of 16 or more carbon atoms) and H2U (triglyceride of 2 saturated fatty acids of 16 or more carbon atoms and one cis-unsaturated fatty acid) taken together is at least 55% wt based on the total amount of triglycerides, preferably at least 65% % wt based on the total amount of triglycerides. In other words: H3+H2U$\geq$55%, preferably $\geq$65% wt, based on total triglycerides.

This means that of the total amount of triglycerides present in the composition according to the invention at least 55% wt (preferably at least 20% wt) are triglycerides of fully saturated C16 and longer chains (e.g. C16, C18, C20, C22 and C24) and/or triglycerides containing one cis-unsaturated fatty acid of any chain length and two saturated fatty acids of 16 or more carbon atoms. In connection to this, it Is believed that the dry and/or particulate and/or pasty savoury food compositions as currently on the market comparable to the compositions according to the Invention contain about 30-50% of such H3+H2U triglycerides as part of their fats. Following the invention, it is now possible to manufacture a savoury food composition comprising 5-70% wt of di- and/or triglycerides of fatty acids, 2-50% wt (preferably 5-40% wt) of an edible salt and which composition contains less than 15% wt of water (preferably less than 10% wt), wherein the triglycerides are selected such that they contain less than 5%, preferably less than 2% wt of trans-unsaturated fatty acids, and preferably having less than 10% wt (more preferably less than 3%, most preferably less than 0.5%) of lauric acid, and wherein the fast still have appropriate melting and crystallisation behaviour.

DETAILED DESCRIPTION OF THE INVENTION

In the composition according to the invention it is preferred that the amount of H3 (triglyceride of 3 saturated fatty acids of 16 or more carbon atoms) is at least 15% wt based on the total amount of triglycerides, preferably at least 20%. Likewise, it is preferred that the amount of H2U (triglyceride of 2 saturated fatty acids of 16 or more carbon atoms and 1 cis-unsaturated fatty acid) taken together is at least 40% wt based on the total amount of triglycerides.

Apart from the amounts of H3 and H2U it can be preferred to use fats of such composition in a particular ratio. In this case, the ratio H3/H2U is preferably between 0.5 and 1.2.

Regarding the basic fatty acid composition, it is preferred that the amount of H (i.e. saturated fatty acids of 16 or more carbon atoms) is between 60 and 75% wt based on total amount of fatty acids. Normally, only fatty acids are used with even number of carbon atoms. Similarly, it is preferred that the amount of U (cis-unsaturated fatty acids of any suitable chain length) is between 20 and 45% wt based on total amount of fatty acids.

In the composition according to the invention the amount of palmitic fatty acid (C16:0) in the triglycerides is preferably between 30 and 70% wt based on the total amount of fatty acids. Likewise, the amount of stearic fatty acid (C18:0) is preferably between 0 and 20% wt based on the total amount of fatty acids.

The savoury food compositions according to the invention can be any physical format, but the invention is most suitable for savoury compositions which are in the form of pasty or particulate matter. Examples of this are bouillon or seasoning (different name: culinary) cubes and dry mixes for soups and sauces. Particulate matter is herein to be understood to comprise e.g. flakes, granules, powder, cubes, pellets, tablets. The savoury food compositions according to the invention will usually comprise (e.g. in an amount of 0.1-50% wt) one or more of the following ingredients: herbs and/or spices, tomato powder, vegetable pieces, monosodium glutamate and other components. What above is mentioned pasty also encompasses bouillon or culinary cubes, which may look as a solid, but are to some extent plastic matter (i.e. can be deformed by moderate pressure by hand) and thus by persons skilled in the art recognised as "pasty". Thus, bouillon or culinary cubes which are as such particulates, can consist of pasty matter. Also, complex compositions can be prepared using the material according to the invention. For example, for e.g. bouillon, culinary or seasoning cubes filled with fluid or liquid matter, the shell may be of bouillon or seasoning materail according to the present invention.

The invention also encompasses compositions as set out above, in the form of a particulate soup- or sauce concentrate, which yields a soup or sauce upon mixing and heating with an aqueous liquid. Likewise, compositions as set out above, in the form of a bouillon or broth cube, which yields a bouillon or broth upon mixing and heating with an aqueous liquid.

Following the above, it is now possible to manufacture e.g. dry soup or sauce concentrates which contain a large proportion of vegetable fats, which composition is substantially free from trans-fatty acids or triglycerides thereof. Thus, the invention further relates to a savoury food composition comprising 5-80% wt (preferably 10-70% wt) of triglycerides of fatty acids, 2-80% wt (preferably 5-70%) of an edible salt and which composition contains less than 15% wt (preferably less than 10% wt) of water, wherein at least 50% of the fats is of vegetable origin, and which composition is substantially free from trans-unsaturated fatty acids or triglycerides thereof. Preferably, the compositions according to the invention are substantially free from animal fat.

EXAMPLES

Fat blends 1-6 were prepared from various known fats and fats specifically produced according to the top half of table 1. PO is palm oil. POs is a dry-fractionated palm stearin with a melting point of approx. 53° C. PO58 is fully hardened palm oil. The fatblend "Mix A" was prepared by interesterification of a 60% palm oil, 40% rape 68 blend. PO44 is obtained by hardening palm oil to a melting point of approx. 44° C. In the second half of table 1 the fatty acid composition is given in accordance with the definitions as herein defined, as is the ratio symmetric: asymmetric triglycerides for H2U.

The same data are given for fats in 3 comparative products as have appeared on the market (A-C).

TABLE 1

|        | A    | B    | C    | 1    | 2    | 3    | 4    | 5    | 6    |
|--------|------|------|------|------|------|------|------|------|------|
| Mix A  |      |      |      |      |      |      |      |      | 70   |
| PO     | 33   |      | 50   | 30   | 20   | 40   | 20   |      | 30   |
| Pos    |      |      |      | 70   | 70   | 50   | 80   | 100  |      |
| PO58   |      |      |      |      | 10   | 10   |      |      |      |
| PO44   | 67   | 100  | 50   |      |      |      |      |      |      |
| H3     | 11   | 12   | 11   | 27   | 36   | 31   | 29   | 34   | 32   |
| H2E    | 19   | 29   | 14   | 0    | 0    | 0    | 0    | 0    | 0    |
| H2M    | 1    | 1    | 1    | 1    | 2    | 2    | 1    | 1    | 1    |
| H2U    | 31   | 21   | 36   | 45   | 40   | 42   | 44   | 42   | 46   |
| HE2    | 7    | 10   | 5    | 0    | 0    | 0    | 0    | 0    | 0    |
| H3/H2U | 0.36 | 0.55 | 0.31 | 0.60 | 0.90 | 0.74 | 0.67 | 0.81 | 0.70 |
| H      | 52   | 53   | 52   | 63   | 68   | 64   | 64   | 68   | 64   |

TABLE 1-continued

|           | A  | B  | C  | 1  | 2  | 3  | 4  | 5  | 6  |
|-----------|----|----|----|----|----|----|----|----|----|
| E         | 16 | 24 | 12 | 0  | 0  | 0  | 0  | 0  | 0  |
| U         | 32 | 23 | 37 | 37 | 32 | 36 | 36 | 32 | 34 |
| Palmitic  | 45 | 45 | 45 | 56 | 56 | 53 | 57 | 60 | 35 |
| H3 + H2U  | 42 | 33 | 47 | 72 | 75 | 72 | 73 | 76 | 78 |

Note: the numbers of all the fats given do not add up to 100%, as some minor amounts of other fats are also present.

The fat blends 1-4 have been developed in order to provide a fat blend having suitable properties on melting, crystallisation, mouthfeel, fat staining, etcetera, but without substantial amounts of trans-unsaturated fatty acids, while keeping the amount of lauric acid in the triglycerides low (1% maximum).

The fat blends have been used in the following compositions.

Bouillon Cubes

Bouillon cubes were prepared containing 18% fat, 60% salt/MSG mixture, 20% flavours, herbs and spices, 2% water. The fat blends used were fat blends 1, 2, 5, and 6 of table 1. The cubes was prepared by using conventional processing. The product could be prepared in a similar equipment and fashion as conventional bouillon cube, and had good properties (e.g. oral melt, processability, no fat staining).

Culinary Cube

A culinary cube was prepared containing 28% fat, 25% salt/MSG mixture, 47% flavours, herbs and spices. The fat blend used was fat blend 3 of table 1. The cubes were prepared by using conventional processing. The product could be prepared in a similar equipment and fashion as conventional culinary cube, and had good properties (e.g. oral melt, processability, no fat staining).

Bouillon

An instant bouillon was prepared containing 22% fat, 60% salt/MSG mixture, 14% flavours, herbs and spices, 2% water. The fat blend used was fat blend 4 of table 1. The product could be prepared in a similar equipment and fashion as conventional bouillon composition, and had good properties (e.g. oral melt, processability).

The comparative examples were:

Bouillon Cubes

Conventional bouillon cubes from two different European countries were analysed for the fat composition, which result is given as blends A and B in table 1.

Culinary Cube

A conventional culinary cube from a European country was analysed for the fat composition, which result is given as blend C in table 1.

The invention claimed is:

1. Savoury food composition comprising
   5-80% by wt of triglycerides of fatty acids including palmitic fatty acid (C16:0),
   5-70% by wt of an edible salt,
   0.1-50% by wt of tomato powder and/or vegetable pieces and/or monosodium glutamate,
   less than 10% by wt of water,
   wherein the amount of triglyceride of 3 saturated fatty acids of 16 or more carbon atoms (H3) and triglyceride of 2 saturated fatty acids of 16 or more carbon atoms and 1 cis-unsaturated fatty acid (H2U) taken together is at least 55% by wt based on the total amount of triglycerides;
   wherein the amount of palmitic fatty acid (C16:0) based on the total amount of fatty acids is between 30 and 70% by wt;
      said composition being in the form of a particulate soup or sauce concentrate which yields a soup or sauce upon mixing and heating with an aqueous liquid,
      said composition being substantially free from animal fat; and
   wherein said composition is particulate matter; and wherein said particulate matter comprises flakes, granules, powder, cubes, pellets, tablets.

2. Composition according to claim 1 wherein said amount of H3H2U and taken together is at least 65% by wt based on the total amount of triglycerides.

3. Composition according to claim 1, wherein the amount of triglyceride of 3 saturated fatty acids of 16 or more carbon atoms (H3) is at least 15% by wt based on the total amount of triglycerides.

4. Composition according to claim 1, wherein the amount of triglyceride of 2 saturated fatty acids of 16 or more carbon atoms and 1 cis-unsaturated fatty acid (H2U) is at least 40% by wt based on the total amount of triglycerides.

5. Composition according to claim 1, wherein the amount of H is between 60 and 75% by wt based on total amount of fatty acids.

6. Composition according to claim 1, wherein the amount of U is between 20 and 45% by wt based on total amount of fatty acids.

* * * * *